United States Patent
Duggan et al.

(10) Patent No.: US 10,440,349 B2
(45) Date of Patent: Oct. 8, 2019

(54) 3-D 360 DEGREES DEPTH PROJECTOR

(71) Applicant: Facebook Technologies, LLC, Menlo Park, CA (US)

(72) Inventors: Joseph Duggan, San Francisco, CA (US); Cina Hazegh, Walnut Creek, CA (US); Fei Liu, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 69 days.

(21) Appl. No.: 15/717,332

(22) Filed: Sep. 27, 2017

(65) Prior Publication Data
US 2019/0098276 A1 Mar. 28, 2019

(51) Int. Cl.
| | | |
|---|---|---|
| *H04N 5/232* | (2006.01) | |
| *H04N 13/271* | (2018.01) | |
| *H04N 13/254* | (2018.01) | |
| *H04N 13/282* | (2018.01) | |
| *H04N 13/296* | (2018.01) | |
| *H04N 5/247* | (2006.01) | |

(52) U.S. Cl.
CPC ....... *H04N 13/271* (2018.05); *H04N 5/23238* (2013.01); *H04N 13/254* (2018.05); *H04N 13/282* (2018.05); *H04N 13/296* (2018.05); *H04N 5/247* (2013.01)

(58) Field of Classification Search
CPC .. H04N 13/271; H04N 13/254; H04N 13/296; H04N 13/282; H04N 5/23238
See application file for complete search history.

(56) References Cited

U.S. PATENT DOCUMENTS

| | | | |
|---|---|---|---|
| 5,023,725 A | * | 6/1991 | McCutchen ........... G03B 37/04 348/264 |
| 7,429,997 B2 | | 9/2008 | Givon |
| 8,243,123 B1 | | 8/2012 | Geshwind et al. |
| (Continued) | | | |

FOREIGN PATENT DOCUMENTS

| | | |
|---|---|---|
| CN | 106371281 A | 2/2017 |
| CN | 104408732 B | 7/2017 |
| EP | 3190566 A1 | 7/2017 |

OTHER PUBLICATIONS

Extended European Search Report, European Application No. 18196654.0, dated Feb. 15, 2019, 19 pages.
(Continued)

*Primary Examiner* — Jonathan R Messmore
(74) *Attorney, Agent, or Firm* — Fenwick & West LLP (57) ABSTRACT

A camera system configured to generate depth information for a local area. The camera system comprises a plurality of depth camera sub-assemblies arranged in a substantially spherical arrangement. Each sub-assembly comprises a projector that projects a structured light pattern onto a portion of the local area, such that the projected light patterns of the plurality of sub-assemblies form a tiled light pattern covering 360 degrees of the local area. Each sub-assembly further comprises at least one camera is configured to capture images of the local area. A controller of the camera system is configured to receive the captured images and to construct a 360 degree depth map of the scene, based upon the structured light patterns projected by the projectors of the plurality captured in the received images.

16 Claims, 5 Drawing Sheets

(56) References Cited

U.S. PATENT DOCUMENTS

| | | |
|---|---|---|
| 2004/0246333 A1 | 12/2004 | Steuart |
| 2013/0215235 A1* | 8/2013 | Russell .................. G03B 35/00 |
| | | 348/47 |
| 2014/0153916 A1 | 6/2014 | Kintner |
| 2015/0002734 A1* | 1/2015 | Lee ...................... H04N 5/2256 |
| | | 348/367 |
| 2015/0042765 A1 | 2/2015 | Pfister |
| 2016/0327385 A1* | 11/2016 | Kimura ................... G01C 3/08 |
| 2017/0180708 A1* | 6/2017 | Hazeghi ................ H01S 5/0654 |
| 2017/0331986 A1* | 11/2017 | Houba .................. H04N 5/2253 |
| 2018/0007343 A1* | 1/2018 | Send ....................... G01S 17/46 |
| 2018/0063510 A1* | 3/2018 | Wolke ................ H04N 5/23293 |

OTHER PUBLICATIONS

PCT International Search Report and Written Opinion, PCT Application No. PCT/US2018/047535, dated Jan. 2, 2019, 16 pages.

* cited by examiner

3-D 360 DEGREES DEPTH PROJECTOR

BACKGROUND

The present disclosure generally relates to camera and depth map assemblies, and specifically to 3D-360-degree camera and depth map assemblies for virtual reality systems.

Virtual reality systems capture images and/or video of an environment with one or more cameras. The images and/or video captured by the cameras are reconstructed to create a virtual reality that a user can interact with. The configuration of the one or more cameras impacts the quality of the images captured and the ability to reconstruct the images for a seamless virtual reality experience.

Depth maps may be used in some virtual reality systems to model the distances between various objects in the environment. By combining depth map information with captured images/video, a more realistic virtual reality may be able to be constructed.

SUMMARY

A camera system for generating 3D 360-degree information for a local area. The camera system comprises a plurality of depth camera sub-assemblies arranged in a substantially spherical arrangement around a center point, the plurality of depth camera sub-assemblies together having a 360 degree view of a local area surrounding the camera system. Each depth camera sub-assembly comprises a projector and at least one camera. Each projector faces away from the center point and is configured to project a structured light pattern over a field of view of the local area. The projected structured light pattern is part of a tiled structured light pattern projected into 360 degrees of the local area. The tiled structured light pattern is formed by the light patterns projected by the projectors of each of the depth camera sub-assemblies. The one or more cameras of each depth camera sub-assembly are positioned facing away from the center point, and are configured to capture images of at least a portion of the structured light pattern projected by the projector of the depth camera sub-assembly. The one or more cameras of the depth camera sub-assemblies have fields of view that collectively cover 360 degrees of the local area.

The camera system further comprises a controller in communication with the projectors and cameras of the depth camera sub-assemblies. The controller is configured to receive the one or more images from the at least one camera of each of the plurality of depth camera sub-assemblies, and to construct a 360 degree depth map of the local area, based upon the structured light patterns projected by the projectors of the plurality of depth camera sub-assemblies in the received images.

As noted above the projectors are configured to emit structured light patterns. A structured light pattern is light that is used for depth determination. A structured light pattern may be, e.g., lines, dots, sinusoids, diffuse light (e.g., useful for determining depth via time-of flight techniques), or some other form of light that can be used for depth determination. The structured light pattern may be pulsed (e.g., a flash) or continuous. A structured light pattern may be in a visible frequency range or a non-visible frequency range (e.g., IR frequency range). The one or more cameras are configured to capture images in the frequency range corresponding to the light patterns. In some embodiments, the one or cameras may also be configured to capture images in the visible frequency range and/or when the projectors are not projecting structured light patterns, in order to capture plain images of the local area that do not contain a projected light pattern. The plain images of the local area may be combined with calculated depth information of the local area (e.g., the 360 degree depth map of the local area) to generate a 3D 360 model of the local area, which may be used in various VR or AR applications.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
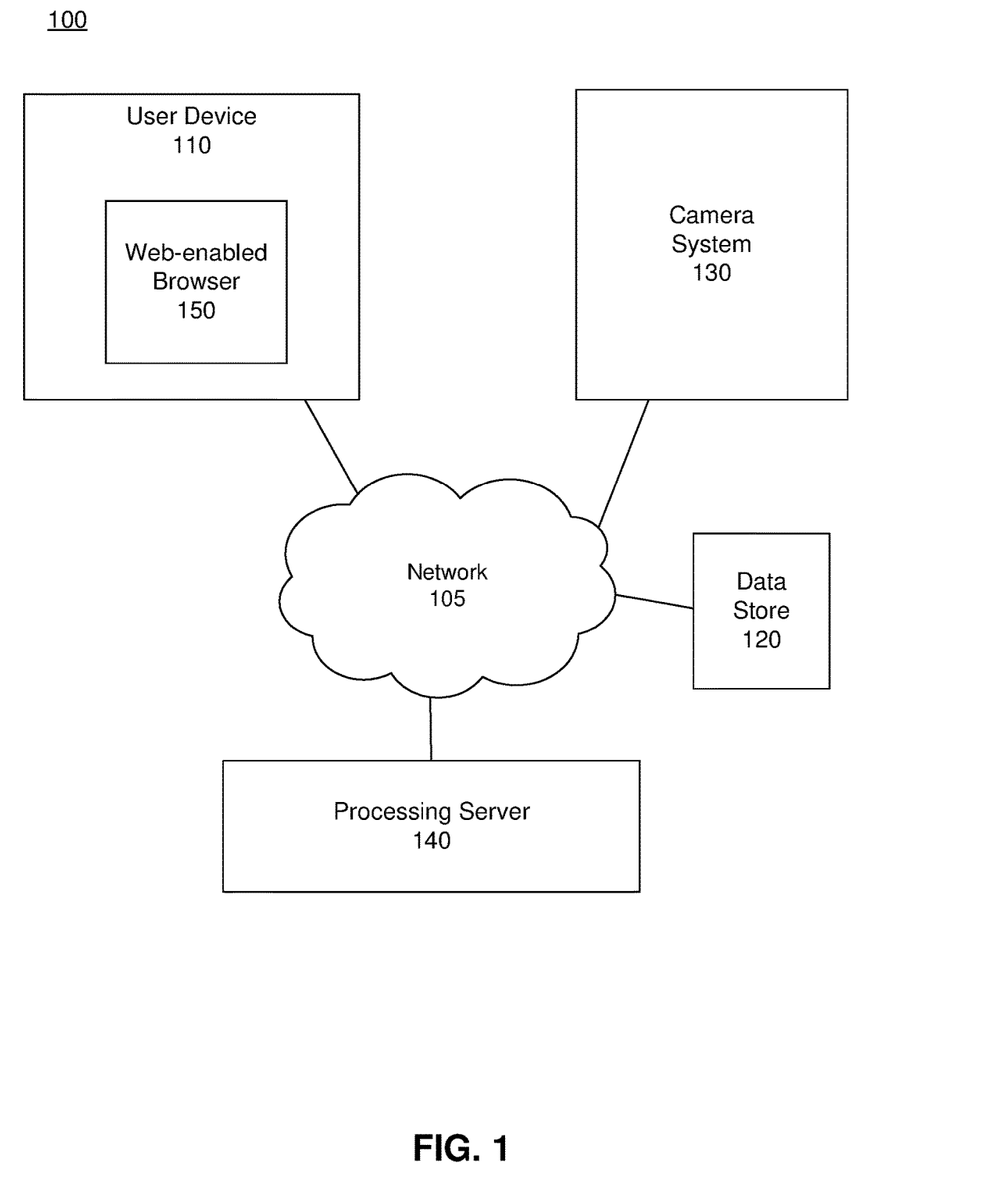
FIG. 1 is a high-level block diagram illustrating an embodiment of a system for generating 3D-360 degree images for a virtual reality system, according to an embodiment.

FIG. 1 is a high-level block diagram illustrating an embodiment of a system 100 for generating 3D-360 degree images for a virtual reality system, according to an embodiment. The system 100 includes a network 105 that connects a user device 110 to a data store 120, a camera system 130, and a processing server 140. In the embodiment of FIG. 1, only one user device 110 is illustrated, but there may be multiple instances of this entity. For example, there may be multiple user devices 110 coupled, via the network 105, to the data store 120, the camera system 130, and the processing server 140.

The network 105 provides a communication infrastructure between the user devices 110, the data store 120, the camera system 130, and the processing server 140. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network. In some embodiments, the user device 110 may communicate directly with the camera system 130 using wired or wireless communications (e.g. RF transmission).

The user device 110 is a computing device that executes computer program modules—e.g., a web-enabled browser 150 or some other client application—which allow a user to view a user interface for the camera system 130. A user device 110 might be, for example, a personal computer, a tablet computer, a smart phone, a laptop computer, or other type of network-capable device.

The data store 120 stores image information from the camera system 130 and the processing server 140. In some embodiments, the data store 120 can be cloud-based and is accessed by the camera system 130 and the processing server 140 via the network 105. The data store 120 may receive and store image information directly from the camera system 130, or the data store 120 may receive and store image information from the processing server 140 after the image information has been processed. In one embodiment, the data store 120 is a part of the processing server 140. In another embodiment, the data store 120 is an archive maintained by a third-party storage provider.

The camera system 130 generates image information using captured images and/or audio information of a local area surrounding the camera system 130. The camera system 130 comprises an assembly of cameras positioned to capture a 360 degree view of the local area. In the embodiment of FIG. 1, the assembly includes a plurality of cameras mounted to a rigid surface or structure. The camera system 130 also comprises one or more projectors configured to project structured light over the local area that may be detected by the assembly of cameras, in order to calculate depth information of various objects in the local area that may be included in the image information. In some embodiments, at least a portion of the plurality of cameras are arranged such that adjacent cameras may produce stereo images of the local area. Embodiments of the camera system 130 are discussed in detail below with regard to the remaining figures. As used herein, the assembly of camera and projectors in the camera system 130 may collectively be referred to as a "depth camera assembly."

The local area is the environment that surrounds the camera system 130. For example, the local area may be a room that the camera system 130 is inside, or the camera system 130 may be outside and the local area is an outside area that is visible to the cameras of the camera system 130. Image information is information output by the camera system 130. Image information may include, e.g., one or more images, audio information (e.g., sounds captured by one or more microphones), video information, depth information, metadata, or some combination thereof. Metadata is additional information associated with the image information. Metadata may include, e.g., frame rate, exposure settings (e.g., shutter speed, gain, etc.), copyright information, date/time information, camera identifier, names, labeling, some other information associated with the image information, or some combination thereof. The camera system 130 includes memory storage that buffers and stores the image information. In some embodiments, the camera system 130 may be locally coupled to (e.g., via some wired and/or wireless connection) an external data store. In some embodiments, the camera system 130 is configured to send the image information to the processing server 140 via the network 105. In alternate embodiments, the camera system 130 is configured to process the image information (e.g., using captured images or video and calculated depth information) to form 3D-360 degree content at a high resolution. For example, 3D-360 degree content video content may be at, e.g., 4K, 6K, 8K resolution, or some other resolution supported by the camera system 130.

The camera system 130 comprises a plurality of projectors and a plurality of cameras used to determine depth information for a local area surrounding the camera system. Each of the plurality of projectors is configured to project a light pattern onto a different portion of the local area, such that the light patterns of the plurality of projectors collectively cover all or substantially all of the local area (e.g., a 360 degree view of the local area). Each of the cameras is configured to capture images of a respective portion of the local area, such that light patterns projected by the projectors over the respective portion of the local area can be identified. The identified light patterns from the captured images are used to determine depth information for the respective portion of the local area. In some embodiments, the determined depth information may comprise a 360 degree depth map of the local area.

The projectors are configured to emit structured light patterns. A structured light pattern is light that is used for depth determination. A structured light pattern may be, e.g., lines, dots, sinusoids, diffuse light (e.g., useful for determining depth via time-of flight techniques), or some other form of light that can be used for depth determination. The structured light pattern may be pulsed (e.g., a flash) or continuous. A structured light pattern may be in a visible frequency range or a non-visible frequency range (e.g., IR frequency range). For example, locations in the captured images corresponding to portions of the structured light patterns projected onto objects in the local area may be used to determine depth information of the objects based upon a known offset distance between the projector and the camera. In some embodiments, where the projector is configured to project an IR flash, the camera may comprise a sensor configured to detect the projected IR flash and determine depth information using time of flight (ToF) techniques. In some embodiments, two or more cameras of the camera system 130 may have partially overlapping field of view, allowing for depth information for some portions of the local area to be determined using stereo imaging. The determined depth information for the local area may be combined with image or video data of the local area in order to generate 3D-360 degree content (e.g., a 360 degree depth map of the local area, a three-dimensional model of the local area, etc.).

In some embodiments, the camera system 130 may receive instructions from a user specifying one or more camera system settings. For example, the camera system 130 can include a web server that allows users to control the camera system 130 using, e.g., the web-enabled browser 150 on the user device 110 via the network 105. The camera system settings may comprise any settings used to operate the projectors or cameras of the camera system 130. For example, camera system settings may comprise the type of light pattern projected by the projectors, the timing of the projectors in projecting the light patterns and the cameras in capturing images, and/or the like. In some embodiments, one or more camera system settings may be determined automatically by the camera system. For example, the camera system 130 may determine a global exposure setting (e.g., gain, shutter speed, aperture) using information from one or more cameras in the camera system 130, and applies the global exposure setting to all of the cameras in the camera system 130. Accordingly, each camera, regardless of a light metering specific to that camera, uses the global exposure settings. The camera system 130 synchronizes the capture of the image information using a global shutter that causes all of the cameras in the camera system 130 to take an exposure (using the global exposure setting) at the same time. Accordingly, both exposure and time a frame is taken is consistent across all of the image information. In other embodiments, the camera of the camera system 130 may be configured to capture images at different times.

The processing server 140 generates 3D-360 degree content using image information received from the camera system 130. The 3D-360 degree content is media content associated with a 360 degree field of view of the camera system 130 and at least a portion of which includes depth information and may be rendered in three dimensions (3D). The 3D-360 degree content may include, e.g., an image, a video, audio information, or some combination thereof. The processing server 140 may generate the 3D-360 degree content in high resolution. For example, 3D-360 degree content video content may be at, e.g., 4K, 6K, 8K resolution, or some other resolution supported by the camera system 130. In some embodiments, 3D-360 degree content may be a video of the local area, the video being a merged representation of the images and depth information taken by the camera system 130, and which renders in 3D portions of the video corresponding to images and depth information taken by the camera system 130.

The processing server 140 receives the image information from the camera system 130, the data store 120, or some combination thereof. The processing server 140 is configured to create 3D-360 degree content with an algorithm performed by a set of computer-implemented instructions. The algorithm identifies a set of images in the image information associated with a same time value (e.g., metadata indicates captured at the same time) or within a predetermined time period, and merges the identified images with corresponding depth information to produce a frame of 3D-360 degree content. The processing server 140 may generate video files by coupling together multiple frames of 3D-360 degree content associated with different times. The 3D-360 degree content is output by the processing server 140 and can be stored in the data store 120 for access at a later time. Although FIG. 1 illustrates the processing server 140 as being remote from the camera system 130, it is understood that in other embodiments, at least a portion of the processing server 140 may be implemented as part of the camera system 130 (e.g., as part of a controller for the camera system 130).

The system 100 beneficially allows a user to capture image information of a local area and construct 3D-360 degree content of the local area that may be used in, e.g., a virtual reality (VR) environment, or some other environment (e.g., augmented reality and/or mixed reality). The system 100 may have a rigid structure, a synchronous operation, and a web-based interface. The rigidity of the camera system 130 prevents the plurality of cameras from moving with respect to each other once each camera has been aligned and calibrated, making it easier to process the image information and fuse the images together to construct the 3D-360 degree content. The synchronicity of the plurality of cameras allows for global settings to be applied to each camera and improves the quality of the image information captured, which, in turn, improves the quality of the 3D-360 degree content that is constructed. The web-based interface provides ease-of-use for a user to set up the system 100, preview captured image information, apply global settings, process image information, and access, use, or store 3D-360 degree content.

Camera System

Figure 2:
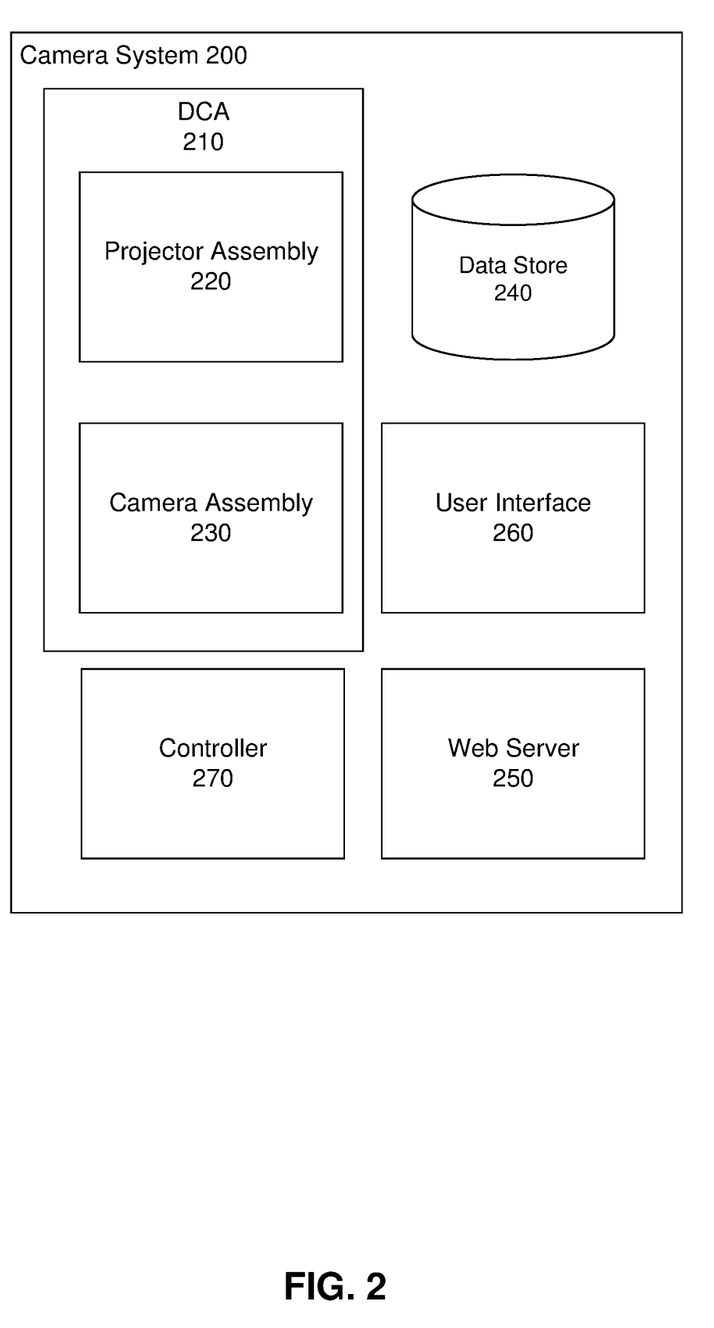
FIG. 2 is a high-level block diagram illustrating a detailed view of modules within a camera system, according to one embodiment.

FIG. 2 is a high-level block diagram illustrating a detailed view of modules within a camera system 200, according to one embodiment. The camera system 200 may be an embodiment of the camera system 130 illustrated in FIG. 1. Some embodiments of the camera system 200 have different modules than those described here. Similarly, the functions can be distributed among the modules in a different manner than is described here. The camera system 200 is comprised of modules including a depth camera assembly 210 (comprising a projector assembly 220 and a camera assembly 230), a data store 240, a web server 250, a user interface 260, and a controller 270.

The projector assembly 220 projects a light pattern onto a local area using a plurality of projectors having fields of view that substantially cover 360 degrees of the local area. The light pattern may be comprised of a plurality of light beams projected in an identifiable pattern, based upon emission instructed received from the controller 270. In some embodiments, the projected light patterns correspond to a structured light pattern. In addition, as used herein, the projected light patterns may include diffuse light that may be detected using a ToF sensor of a camera of the camera assembly 230. The diffuse light may be, e.g., continuously emitted or pulsed. The light pattern may comprise visible light, infrared (IR) light, or light in any other spectrum that may be detected by the cameras of the camera assembly 230.

Each projector of the projector assembly 220 comprises one or more illumination sources and/or one or more optical elements. An illumination source is configured to emit light (e.g., as an optical beam), and may emit multiple wavelengths of light. The illumination source may emit light in, e.g., a visible band (~380 nm to 750 nm), in an infrared (IR) band (~750 nm to ~1,800 nm), in an ultraviolet band (~100 nm to 380 nm), some other portion of the electromagnetic spectrum that the camera 304 is configured to detect, or some combination thereof. An illumination source may be, e.g., a laser diode (e.g., edge emitters), an inorganic or organic LED, a vertical-cavity surface-emitting laser (VCSEL), or some other source. In some embodiments, a single illumination source or a plurality of illumination sources in the projector can emit light having a structured light pattern. In other embodiments, the structured light pattern is generated by the illumination sources of the projector emitting light through a diffractive optical element located at an illumination aperture of the projector. Light emitted from the one or more of the illumination sources may be, e.g., polarized (e.g., linear, circular, etc.).

The projector projects the light pattern onto the local area (e.g., onto one or more objects in the local area), and may comprise one or more optical elements that direct the light pattern through the illumination aperture of the projector and into the local area. A projector generates a structured light pattern (e.g., dots, lines, diffused light) in accordance with instructions provided by a controller. In some embodiments, the projector includes a light source, a diffractive optical element (DOE), and a projection assembly. The projector may include additional or different components. For example, the projector can have more than one DOE, and each DOE may have different configuration and generates different types of structured light pattern. In some embodiments, the projector may comprise a diffuser usable in ToF (time-of-flight) technology applications. Also, the projector may have more than one light source, and each light source emits light at a different wavelength. The projection assembly is one or more optical elements that project the structured light pattern into the local area.

In some embodiments, the projector assembly 220 comprises a plurality of projectors, each configured to project a light pattern over a respective portion of the local area corresponding to a field of view of the projector. The respective portions of the local area corresponding to the plurality of projectors may be tiled such that they encompass all or substantially all of the local area surrounding the depth camera assembly 210. In some embodiments, the fields of view of two or more of the projectors of the projector assembly 220 may be partially overlapping. In other embodiments, the fields of view of each projector of the projector assembly 220 may each define a tileable boundary, such that the fields of view of the projectors do not substantially overlap.

In some embodiments, the plurality of projectors of the projector assembly 220 may project respective light patterns over different time periods, or over different frequency ranges, allowing for the light patterns from each projector to be differentiated from each other. In some embodiments, the light patterns of each of the projectors are associated with a different phase shift. In some embodiments, the plurality of projectors project a changing light pattern at a high frequency, allowing for the depths of objects within the local area to be measured using a time of flight (ToF) camera.

The projector assembly 220 receives emission instructions from the controller 270 controlling how the projectors of the projector assembly 220 project light, e.g., time periods during which the projectors projects light, type of light projected, intensity of light projected, pattern of light projected, and/or the like.

The camera assembly 230 captures image information using a plurality of cameras that are positioned to collectively view 360 degrees of a local area. In some embodiments, the cameras of the camera assembly 230 may have overlapping fields of view, such that at least a portion of the local area is captured in stereo. The image information may include, e.g., one or more images, audio information, video information, metadata, or some combination thereof. The image information can be captured in various file formats for images (e.g. .jpeg, .tif, .png, etc.), audio (e.g. .aac, .mp3, .wav, etc.), and/or video (e.g. .mpg, .mov, .wmv, etc.).

The cameras of the camera assembly 230 are configured such that the light patterns projected by the projector assembly 220 may be detected using the captured images. The cameras of the camera assembly 230 are configured to capture images in at least a frequency range corresponding to the light patterns projected by the projector assembly 220. For example, if the projectors of the projector assembly 220 are configured to project light patterns in the IR spectrum, the cameras of the camera assembly 230 include IR cameras able to capture images of the projected light patterns. In some embodiments, the cameras can switch between capturing images in the IR spectrum (or other non-visible spectrum) and the visible spectrum. For example, the cameras may be configured to operate in the IR spectrum during first time periods to capture images of the projected light patterns for purposes of determining depth information, and to operate in the visible spectrum during second time periods to capture images of the local area. In some embodiments, the camera assembly 230 comprises a first subset of cameras configured to capture images in the IR spectrum and a second subset of cameras configured to capture images in the visible spectrum. Each of the first and second subsets of the cameras of the camera assembly 230 may be configured to have a combined field of view that covers a 360 degree view of the local area, such that complete image information and depth information for the local area may be obtained. In some embodiments, where the projector assembly 220 is configured to project visible light onto the local area, the cameras of the camera assembly 230 may be configured to capture images of the local area during first time periods when the projector assembly 220 is projecting light (e.g., to detect the projected light pattern for determining depth information) as well as during second time periods when the projector assembly 220 is not projecting light (e.g., to capture images of the local area that do not include the projected light patterns).

The captured images are used by a processor (e.g., the controller 270, a remote processor such as the processing server 140 illustrated in FIG. 1, and/or the like) to determine depth information for the respective portion of the local area. For example, the depth information may be determined based upon locations of portions of the projected light pattern on the captured images, expected locations of the portions of the projected light pattern, and a known offset between a camera of the camera assembly 230 and a projector of the projector assembly 220. In some embodiments, other techniques for determining depth, such as time of flight (TOF) (e.g., where the light pattern comprises an IR flash of diffuse light), or stereo imaging (e.g., for portions of the local area within the field of views of two or more cameras of the camera assembly 230) may be used.

The camera assembly 230 captures the image information responsive to instructions from the controller 270. In some embodiments, the camera assembly 230 ensures that the image information captured from each of the plurality of cameras is consistent and allows for the construction of uniform, natural-looking 3D-360 degree content. The camera assembly 230 captures and sends some or all of the image information to, e.g., the controller 270, the user interface 260, the data store 240, the processing server 140, the data store 120, or some combination thereof.

Each of the cameras of the camera assembly 230 may comprise a sensor and a lens. The sensor is an electrical device that captures light using an array of photo-sensitive pixels, wherein each pixel converts light into an electronic signal. Sensors can have varying features, such as resolution, pixel size and sensitivity, light sensitivity, type of shutter, and type of signal processing. The lens is one or more optical elements of a camera that facilitate focusing light onto the sensor. A field of view ranging from ~50 to 120 degrees is generally referred to as a wide field of view (WFOV), and a field of view larger than 120 degrees is generally referred to as a fish eye field of view. In some embodiments, the lenses of the camera assembly 230 are configured to have wide coverage of the local area and provide sufficient overlap between fields of view of the cameras of the camera assembly 230 such that high quality 3D-360 degree images can be created. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, a camera of the camera assembly 230 may have a microphone to capture audio information. The microphone can be located within the camera or may be located external to the camera.

In some embodiments, the depth camera assembly 210 is divided into a plurality of depth camera sub-assemblies (not shown in FIG. 2). A depth camera sub-assembly corresponds to a projector of the projector assembly 220 and one or more cameras of the camera assembly 230 associated with the projector. For example, in some embodiments the projectors of the projector assembly 220 have wider fields of view compared to the cameras of the camera assembly 230. As such, a single projector of the projector 220 may project a respective structured light pattern over a region of the local area that substantially overlaps with the fields of view of multiple cameras of the camera assembly 230. The single projector and the cameras having fields of view associated with the projector are in some embodiments collectively referred to as a depth camera sub-assemblies. The plurality of depth camera sub-assemblies are each configured to project and detect a structured light pattern over a different region of the local area, such that the depth camera sub-assemblies collectively project and detected structured light patterns that cover all or substantially all of the local area.

The data store 240 of the camera system 200 is a local memory storage that stores image information. The data store 240 receives and stores the image information from the camera assembly 230. In some embodiments, the data store 240 may upload image information to, e.g., an external data store (e.g., data store 120 illustrated in FIG. 1), a processing server (e.g., processing server 140), or some combination thereof. In some embodiments, the data store 240 acts as a buffer. For example, the camera system 200 may generate image information at a rate that exceeds an upload rate to an external data store and/or a processing server. Accordingly, the data store 240 may temporarily buffer the image information to ensure that the upload rate does not exceed to the external data store and/or a processing server. In some embodiments, the data store 240 may also store preconfigured light patterns that may be projected by the projector assembly 220.

The web server 250 serves as a network 105 interface of the camera system 200. The web server 250 transfers data from the depth camera assembly 210 through the network 105 to the user device 110, the processing server 140, some other entity, or some combination thereof. In some cases, the depth camera assembly 210 may transfer data to the web server 250 using a wired interface (e.g., USB). The data can be compressed or uncompressed.

The user interface 260 allows a user to interface with the camera system 200. In some embodiments, the user interface 260 is a graphical user interface (GUI). In some embodiments, the user interface 260 allows a user to preview data captured by the camera assembly 230 and to control the settings of the camera assembly 230 and/or the projector assembly 220 (e.g., emission instructions for the projector assembly 220). In some embodiments, the user interface 260 may be accessed through a network connection on a mobile phone, tablet, PC, etc., or any other device that has a network connection. In alternate embodiments, the user interface 260 may include a display and one or more input/output devices (e.g., mouse or keyboard) that are directly coupled to the depth camera assembly 210.

The controller 270 is configured to control the operation of the depth camera assembly 210. For example, the controller 270 is configured to generate emission instructions for the projector assembly 220 of the depth camera assembly 210. The emission instructions may specify one or more light patterns to be projected by each projector of the projector assembly 220 (e.g., an arrangement of light beams that make up each pattern, a frequency range associated with each pattern, a phase shift associated with each pattern), a time period during which the light patterns are projected, and/or the like.

In some embodiments, the controller 270 may differentiate between light patterns projected by different projectors of different depth camera assemblies. For example, in some embodiments, the field of view of a camera of the camera assembly 230 may overlap with the fields of view of at least two projectors of the projector assembly 220. As such, an image captured by the camera may be used to identify portions of the light patterns projected by each of the at least two projectors. The controller 270 may need to be able to determine from which projector a particular light pattern portion captured in the images originates from, in order to be able to use the light pattern to determine depth information.

In some embodiments, the controller 270 generates emission instructions instructing the projectors of the depth camera assembly 210 to project their respective light patterns over different time periods in accordance with a time-multiplexing scheme. As such, an image of a portion of the local camera captured by any particular camera at a particular time will only contain portions of the projected light pattern from one projector, even if the field of view of the camera overlaps with the fields of view of two or more different projectors. In some embodiments, the emission instructions may instruct each projector to project a different light pattern onto the local area, such that the controller is able to determine the projector the light pattern is projected from based upon an arrangement of light beams corresponding to a portion of the light pattern captured in an image by the camera. In some embodiments, the light patterns projected by each projector are associated with different frequency bands, different phase shifts, and/or the like, that may be captured by the camera and used to by the controller 270 differentiate between different light patterns from different projectors.

The controller 270 is further configured to provide instructions specifying various settings for the camera assembly 230. These setting comprise exposure settings for cameras in the assembly 230. The exposure settings may include, e.g., aperture size, shutter speed, gain, or some combination thereof. The aperture size controls the amount of light that reaches the sensor. The shutter speed is the length of time that the sensor is exposed to light. The gain is the sensitivity of the sensor to the light. In some embodiments, the controller 270 instructs the camera assembly 230 to determine exposure settings for each of the cameras in the camera assembly 230. The controller 270 determines a global exposure setting using the determined exposure settings, and provides the global exposure setting to all of the cameras in the camera assembly 230. A global exposure setting is a single exposure setting that is applied to all of the cameras in the camera assembly 230. A global exposure setting provides for uniform exposure across all of the plurality of cameras of the camera assembly 220. Without a global exposure setting, each camera in the camera assembly 220 may capture image information at different exposure settings, causing some images to appear lighter or darker than other images. This may create inconsistencies between individual images when the images are stitched together to construct the 3D-360 degree content. Uniform exposure assists in creating natural looking images and/or video in 3D-360 degree content. In some embodiments, the controller 270 is able to determine exposure settings (e.g., aperture, gain, shutter) for the cameras of the camera assembly 230 based on light incident on the sensors of the cameras.

The controller 270 controls a global shutter of the camera assembly 230. A global shutter links the shutter of each camera in the camera assembly 230, such that each shutter opens at the same time (i.e., within less than 1 millisecond of one another), allowing the camera assembly 230 to capture synchronous image information. Capturing synchronous image information ensures that individual images match and can be accurately stitched together by the processing server 140 to construct the 3D-360 degree content. The cameras may be configured to capture images based upon light pattern emission times by the projector assembly 220 as specified by the emission instructions. For example, one or more of the cameras may be synchronized with the projectors to capture images when the projectors project their respective light patterns onto the local area, such that the controller 270 will be able to identify the projected light patterns in the captured images in order to determine depth information of the local area. In addition, one or more cameras may also be configured to capture image information when the projectors are not projecting light patterns, in order to capture image information for constructing 3D-360 degree content. In some embodiments, the cameras of the camera assembly 230 may be configured to capture image information at different times, e.g., when the projectors of the projector assembly 220 are configured to project light patterns over different time periods in accordance with a time multiplexing scheme.

The controller 270 may be further configured to determine depth information of the local area based upon image information captured by the camera assembly 230. For example, the controller 270 processes the image information captured by the camera assembly 230 to extract locations of different portions of the light patterns projected by the projector assembly 220. By comparing the extracted light pattern locations from the captured images with expected light pattern locations as projected by the projector assembly 220, depth information for portions of the local area corresponding to the extracted portion of the light pattern may be determined based upon a known offset between the projector of the projector assembly 220 that projected the portion of the light pattern and the camera of the camera assembly 230 that captured the image information containing the extracted light pattern portion.

In some embodiments, where a portion of the local area of captured by two or more cameras of the camera assembly 230, the controller 270 may determine depth information for the portion of the local area using stereo imaging. In some embodiments, the controller 270 calculates first depth information based upon projected light patterns and second depth information based upon stereo imaging, which may be compared in order to calculate a more accurate depth measurement. In certain situations, determining depth information based upon projected light patterns may have low accuracy (e.g., the objects in the local area have certain types of textures, reflective surfaces, insufficient width, are transparent or translucent, and/or the like). For example, if multiple depth camera assemblies (e.g., associated with different users) are projecting light patterns within the same local area such that the light patterns projected by different depth camera assemblies at least partially overlap with each other, determining depth using the projected light patterns may not be practical due to interference of the overlapping patterns. On the other hand, stereo imaging techniques may not suffer from this problem as they do not rely upon detection of the projected light patterns, and as such may be better suitable for determining depth information in situations interactions between multiple users and depth camera assemblies. In these cases, the controller 270 may determine if the depth information determined using projected light patterns does not meet an accuracy threshold, whereupon the controller 270 may determine depth information using stereo imaging, if available.

In some embodiments, depth information for the local area may be determined by a remote processor, such as the processing server 140 illustrated in FIG. 1, instead of by the controller 270. For example, projected light pattern information and captured image information may be transmitted via the web server 250 to the processing server 140, which may calculate the depth information and generate the 3D-360 degree content.

Figure 3:
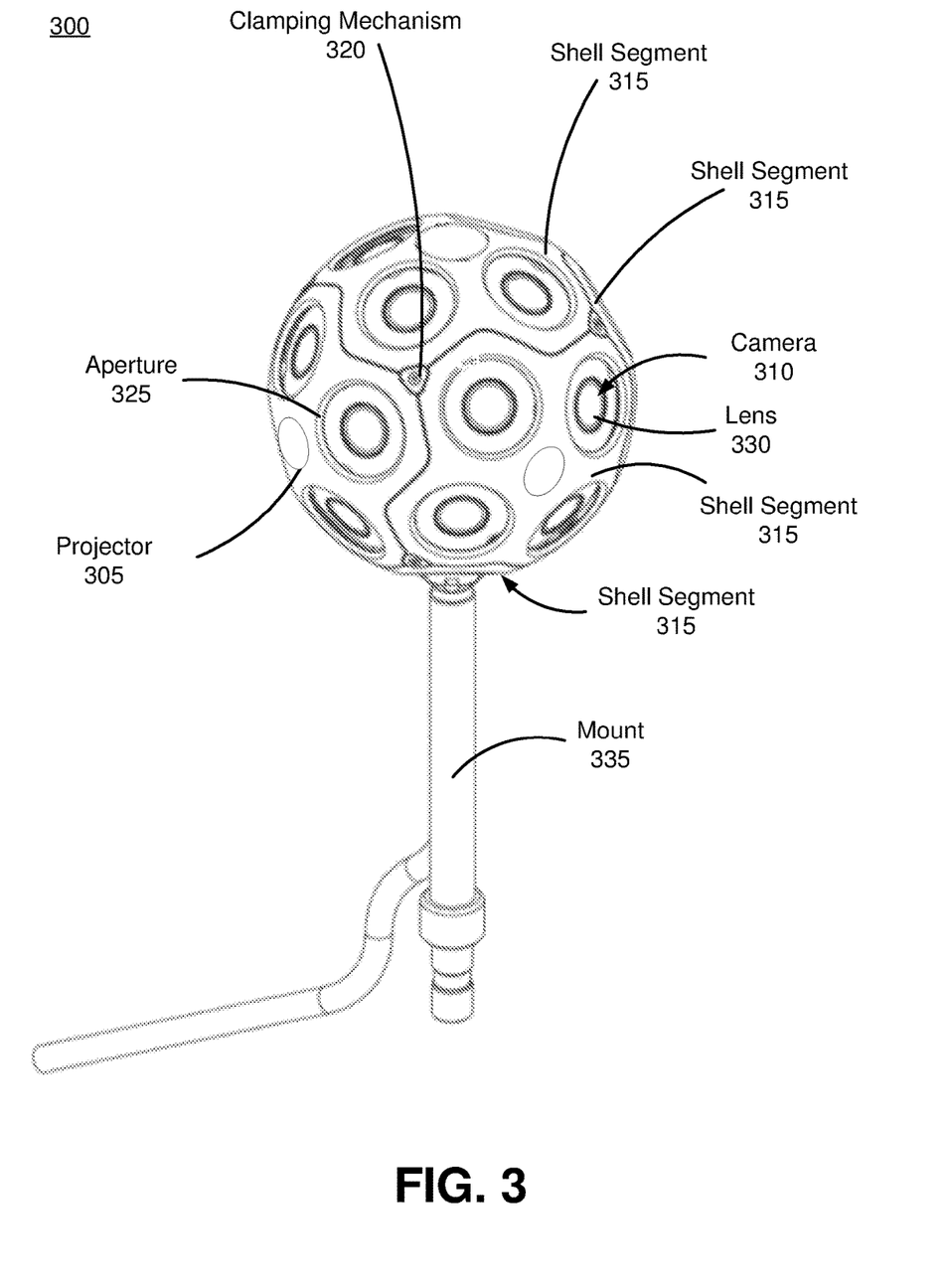
FIG. 3 illustrates an isometric view of a depth camera assembly, according to an embodiment.

FIG. 3 illustrates an isometric view of a depth camera assembly 300, according to an embodiment. The depth camera assembly 300 may correspond to the depth camera assembly 210 illustrated in FIG. 2. The depth camera assembly 300 captures images of a local area surrounding the depth camera assembly 300 that may be used in, e.g., a virtual reality (VR) environment, or some other environment (e.g., augmented reality and/or mixed reality). The depth camera assembly 300 comprises a plurality of projectors 305, a plurality of cameras 310, and a controller (not shown). In some embodiments, the plurality of projectors 305 are part of the projector assembly 220 illustrated in FIG. 2, while the plurality of cameras 310 are part of the camera assembly 230. Some embodiments of the depth camera assembly 300 have different components than those described here. Similarly, in some cases, functions can be distributed among the components in a different manner than is described here.

In some embodiments, the plurality of projectors 305 and cameras 310 of the depth camera assembly 300 are enclosed within a substantially spherical shell comprising a plurality of outer shell segments 315, which may be connected at various joints between the outer shell segments via clamping mechanisms 320. Each outer shell segment 315 comprises a plurality of apertures 325, each aperture being aligned with an illumination aperture of a respective projector 305 or a lens 330 of a respective camera 310.

Each of the one or more projectors 305 is configured to project light over at least a portion of the local area, wherein the projected light is able to be detected by one or more of the cameras 310 of the depth camera assembly 300. Each of the projectors 305 is configured to project light (e.g., a structured light pattern) away from a center region of the depth camera assembly 300. In some embodiments, the projectors 305 each have an optical axis that intersects with the center point of the substantially spherical shell of the depth camera assembly 200. The field of view of each projector 305 (corresponding to the portion of the local area that the projector 305 is able to project light over) may be wider than the field of view of each of the cameras 310. For example, as illustrated in FIG. 3, each projector 305 of the depth camera assembly 300 is positioned at the center of a shell segment 315 between a plurality of cameras 310, and is configured to project light over a respective portion of the local area that substantially encompasses the combined fields of view of the surrounding cameras 310 associated with the same respective shell segment.

The plurality of cameras 310 capture images and/or video of the local area, and may be arranged in a substantially spherical arrangement, such that the fields of view of the cameras 310 collectively cover a 360 degree view of the local area. The images/video captured by the camera 310 may comprise plain images of the local area (e.g., without detectable projected light patterns), or images of the local area where projected light patterns (e.g., a structured light pattern, an IR flash, etc.) can be detected. As illustrated in FIG. 3, the plurality of cameras 310 are positioned such that a field of view of each camera 310 is directed away from a center region of the depth camera assembly 300. The plurality of cameras 310 are arranged such that an optical axis of each camera 310 is in a different direction from the other cameras 310, to capture a 360 degree view of the local area. For example, the plurality of cameras 310 may be arranged such that the optical axis of each camera intersects a center point (not shown) of the substantially spherical shell of the depth camera assembly 300.

In some embodiments, at least a portion of the plurality of cameras 310 are arranged such that some or all of adjacent cameras produce stereo images of the local area. For example, the cameras 310 may have field of view such that portions of the local area beyond a threshold distance will fall within a field of view of two or more of the cameras 310. Note that FIG. 3 shows an example angle of orientation for each of the cameras 310 illustrated, and that in other embodiments, one or more of the cameras 310 may be oriented in different directions.

A particular projector 305 and the cameras 310 configured to detect the light projected by the projector 305 may be referred to collectively as a "depth camera sub-assembly." For example, the depth camera assembly 300 illustrated in FIG. 3 comprises six different depth camera sub-assemblies, one corresponding to each shell segment. Each depth camera sub-assembly in FIG. 3 comprises a projector 305 located at a center of its respective shell segment 315, surrounded by a plurality of cameras 310. The field of view of the projector 305 may be configured to substantially cover the collective fields of view of the surrounding cameras 310 of the depth camera sub-assembly.

In some embodiments, multiple depth camera sub-assemblies are used to provide 360-degree coverage of the local area (e.g., as illustrated in FIG. 2). For example, each depth camera sub-assembly comprises its own projector configured to project a light pattern over a different portion of the local area. The fields of view may be tiled such that the collective fields of view of the projectors cover all or substantially all of the local area surrounding the depth camera assembly 300. In some embodiments, the fields of view of two or more projectors of different depth camera sub-assemblies may partially overlap. For example, a particular camera associated with one depth camera sub-assembly may be able to capture an image of a portion of the local area within a field of view of the projector of a different depth camera sub-assembly. In other embodiments, the fields of view of each projector is configured such that they do not substantially overlap. In some embodiments, the field of view of each camera may be substantially within the field of view of its associated projector.

While the embodiment of FIG. 3 includes a certain number of cameras and projectors, the configuration of the depth camera assembly 300 is scalable to allow for different numbers of projectors 305 and cameras 310 to be included, and the dimensions of the shell segments 315 may be scaled proportionally to accommodate the number of projectors 305 and cameras 310. The depth camera assembly 300 can be mounted to a mount 335 that allows the depth camera assembly 300 to be positioned within an environment.

Figure 4A:
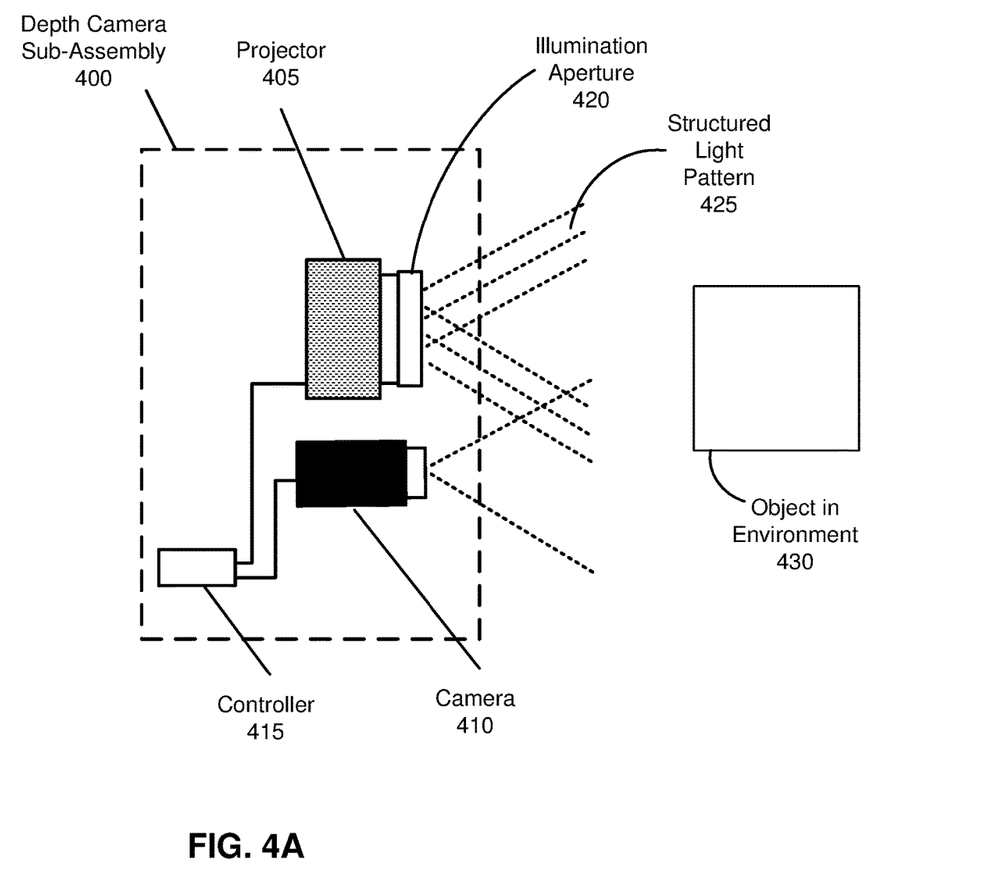
FIG. 4A illustrates a block diagram of a depth camera sub-assembly, in accordance with some embodiments.

FIG. 4A illustrates a block diagram of a depth camera sub-assembly 400, in accordance with some embodiments. The depth camera sub-assembly 400 may correspond to the depth camera sub-assembly to the depth camera assembly 300 illustrated in FIG. 3, and is configured to determine depth information of one or more objects in a local area surrounding some or all of the depth camera assembly 300. The depth camera sub-assembly 400 comprises a projector 405, at least one camera 410, and a controller 415 that may be coupled to both the projector 405 and the at least one camera 410. It is understood that while FIG. 4A only illustrates a single camera 410 in the depth camera sub-assembly 400, the depth camera sub-assembly 400 may in some embodiments comprise multiple cameras 410. In some embodiments, the controller 415 is shared by multiple depth camera sub-assemblies of the depth camera assembly.

The projector 405 emits light through an illumination aperture 420. In accordance with embodiments of the present disclosure, the projector 405 is configured to illuminate the local area with one or more structured light patterns 425 (e.g., dots, lines, IR flash, etc.) in accordance with emission instructions generated by the controller 415. The controller 415 may control operation of certain components of the projector 405, based on the emission instructions. For example, the controller 415 may provide the emission instructions to a diffractive optical element of the projector 405 to control a field-of-view of the local area illuminated by the one or more structured light patterns 425.

The projector 405 generates a structured light pattern 425, and projects the generated light pattern onto the local area, which may include one or more objects 430. The camera 410 captures, through an imaging aperture, portions of the one or more structured light patterns 425 scattered or reflected from the objects 430 within the local area. For example, the camera 410 captures one or more images of the objects 430 in the local area illuminated with the one or more structured light patterns 425, from which the locations of the structured light patterns 425 within the captured images can be determined. In some embodiments, the camera 410 may also determine a phase shift associated with a projected light pattern, or a time of flight associated with the projected light pattern.

The controller 415 controls the projector 405 and the camera 410. The controller 415 provides the projector 405 emission instructions, which may control, e.g., the one or more illumination sources and/or optical elements of the projector 405 (e.g., beam intensity, modulation of the optical beam, wavelength of the optical beam, duration of the one or more optical beams, one or more optical elements in a projection assembly, or some combination thereof), the camera 410 (e.g., shutter, ISO, aperture, focus, other properties of the camera 410, or some combination thereof), or some combination thereof.

The controller 415 also determines depth information of one or more objects 430 in the local area imaged by the camera 410. For example, the controller 415 may identify the location of various portions of the structured light pattern 425 in images captured by the camera 410, and determine depth information corresponding to portions of the captured images based upon the identified structured light pattern locations and a known distance between the camera 410 and the projector 405. The controller 415 provides the determined depth information to a console and/or an appropriate module of the camera system 100 (e.g., the processing server 140 illustrated in FIG. 1), which may utilize the depth information to, e.g., generate 3D-360 degree content (e.g., for presentation on a VR or AR device). For example, the processing server 140 may generate a three-dimensional model of the local area which may be used to display three-dimensional virtual objects to a user using a VR device.

Figure 4B:
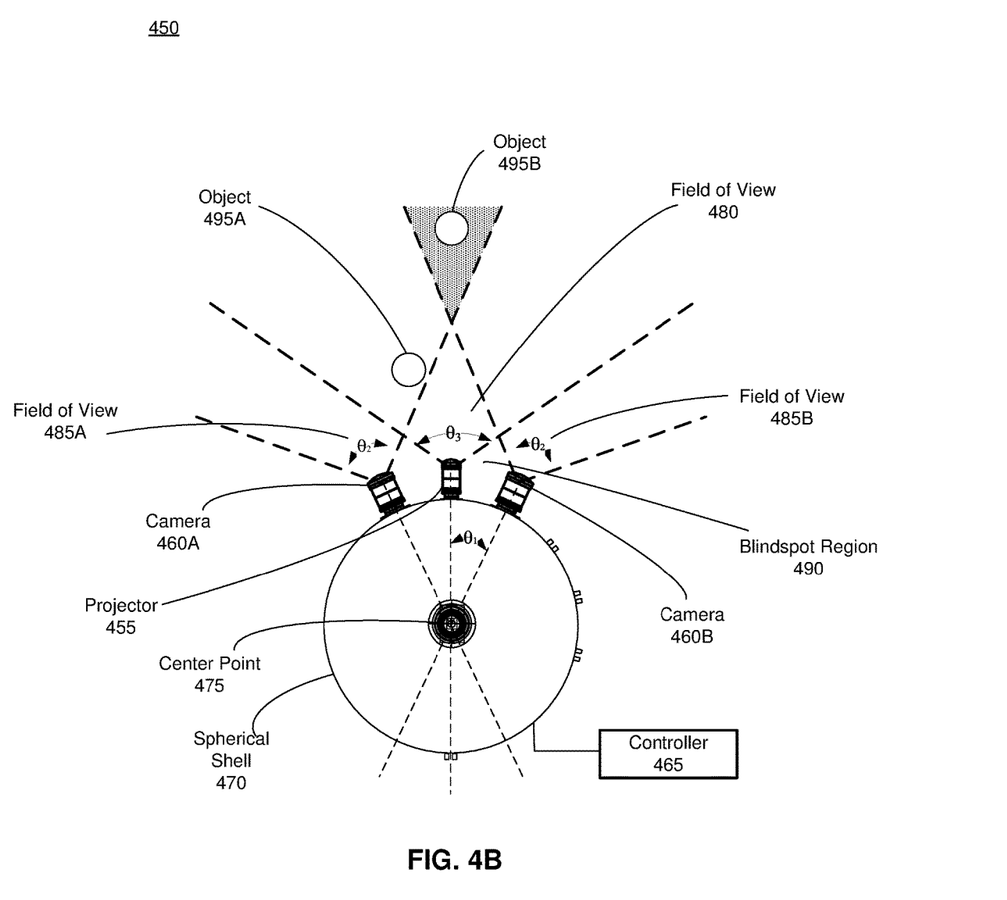
FIG. 4B illustrates a top-down view of a portion of a depth camera assembly, in accordance with another embodiment.

FIG. 4B illustrates a top-down view of a depth-camera sub-assembly 450, in accordance with another embodiment. The depth camera sub-assembly 450 may be similar to a portion of the depth camera assembly 210 illustrated in FIG. 2, or a portion of the depth camera assembly 300 illustrated in FIG. 3. The depth camera sub-assembly 450 may be part of a depth camera assembly containing other depth camera sub-assemblies (not shown). The illustration in FIG. 4B is used for reference and may not be illustrated to scale.

The depth camera sub-assembly 450 comprises a projector 455 and at least two cameras 460A and 460B arranged along an outer periphery of a substantially spherical shell 470 having a center point 475. The spherical shell 470 may comprise a plurality of shell segments (e.g., shell segments 315 illustrated in FIG. 3). The projector 455 is configured to project structured light (e.g., dots, lines, IR flash, and/or the like) over a first field of view 480, while the cameras 460A and 460B are each configured to capture images over respective fields of view 485A and 485B. In some embodiments, the field of view 480 of the projector 455 is configured to be wider than the fields of view 485A and 485B of each of the cameras 460A and 460B. In some embodiments, the field of view 480 of the projector 455 is configured to be tiled with the fields of view of the projectors (not shown) of other depth camera sub-assemblies, such that the fields of views of the projectors of the depth camera assembly that the depth camera sub-assembly 450 is a portion of will cover all or substantially all 360 degrees of the local area surrounding the depth camera assembly. In addition, the fields of view 485A/B of the cameras 460A/B, combined with the fields of the view of the cameras of the other depth camera sub-assemblies (not shown) may collectively cover all or substantially all 360 degrees of the local area.

The projector 455 projects a structured light pattern over the local area in accordance with emission instructions generated by the controller 465, which may include objects 495A and 495B. The cameras 460A and/or 460B are able to capture images of the local area containing the objects 495A and/or 495B in response to instructions from the controller 465, wherein portions of the projected light pattern on the objects 495A and/or 495B may be detected on the captured images. The controller 465 generates determine depth information associated with the objects 495A and 495B based upon locations of portion of the projected light pattern on the images captured by the cameras 460A and 460B and known distances between the projector 455 and the cameras 460A and 460B.

As illustrated in FIG. 4B, the projector 455 and the cameras 460A/B may be arranged such that an optical axis of each projector 455 and camera 460A/B intersects the center point 475 of the spherical shell 470. In some embodiments, the cameras 460A/B are separated from the projector 455 by a known spacing distance. In some embodiments, the spacing distance is configured such that the field of view 480 of the projector 455 substantially overlaps with the fields of view 485A and 485B of the cameras 460A and 460B.

In some embodiments, each of the cameras 460A and 460B may be oriented at a slight angle, $\theta_1$, relative to the projector 455. For example, in some embodiments, the angle $\theta_1$ is configured to allow for significant overlap between the field of view 480 of the projector 455 and the fields of the view 485A and 485B of the cameras 460A and 460B. In some embodiments, the angle $\theta_1$ and the field of views of each of the cameras 460A and 460B are configured such that the fields of views of the camera at least partially overlap, so that objects in certain portions of the local area imaged by the cameras 460A and 460B can be seen by at least two cameras (e.g., both cameras 460A and 460B. For example, as illustrated in FIG. 4B, the fields of view 485A and 485B for the cameras 460A and 460B overlap beyond a threshold distance, the overlapping fields of view represented by a shaded region in FIG. 4B.

In the embodiment of FIG. 4B, each of the cameras 460A and 460B has a field of view 485A and 485B defined by an angle $\theta_2$. The regions between the fields of view 485A and 485B may correspond to a blindspot region 490 in which the objects are not viewed by either camera 460A or 460B. While FIG. 4B shows a two-dimensional slice of the depth camera sub-assembly 450, it is understood that in some embodiments, additional cameras (not shown) may be located above or below the projector 455 on the periphery of the spherical shell 470, in addition to the left and right of the projector 455 as illustrated in FIG. 4B, such that the size of the blindspot regions 490 are minimized.

The field of view 480 of the projector 455 may have an angle $\theta_3$ that is wider than the angle $\theta_2$ of the fields of view 485A and 485B the cameras 460A and 460B, such that the field of view of the projector 455 substantially overlaps with the fields of view of multiple cameras (e.g., the cameras 460A and 460B). This allows for a reduction in the number of projectors 455 required to implement the depth camera assembly, as a smaller number of projectors 455 will be able to project light patterns over a 360-degree view of the local area. For example, as illustrated in FIG. 3, each depth camera sub-assembly of the depth camera assembly comprises a single projector surrounded by multiple cameras. In addition, although FIG. 4B illustrates the fields of view of the cameras 460A and 460B extending beyond the field of view of the projector 455 (and potentially overlapping with the fields of view of other projectors of the depth camera assembly (not shown)), it is understood that in some embodiments, the fields of view of each camera 460A and 460B lie entirely within the field of view of the associated projector 455. As such, the images captured by each camera 460A or 460B will only include the light patterns projected by a single projector of the depth camera assembly, potentially reducing interference that may be associated with the projected light patterns of different projectors.

In some embodiments, as illustrated in FIG. 4B, some objects in the local area (e.g., object 495A) may be within the field of view of the projector 455 and one camera 460A. As such, depth information associated with the object 495A may be determined using the structured light patterns projected by the projector 455 (e.g., based upon locations of portions of the projected structured light pattern in the images captured by the camera 460Aa and the known distance between the camera 460A and the projector 455).

On the other hand, other objects in the local area (e.g., object 495B) may be within the field of view of two or more cameras (e.g., cameras 460A and 460B). As such, depth information associated with the object 495B may be determined based upon structured light patterns projected by the projector 455, stereo imaging using captured images from the cameras 460A and 460B, or some combination thereof. For example, in some embodiments, stereo imaging techniques may be used to calculate a depth of the object 495B, which may be used to verify a depth of the object 495B calculated using structured light techniques, potentially improving the accuracy of the calculated depths for the object 495B.

The cameras of the depth camera sub-assembly 450, including the cameras 460A and 460B, may be positioned such that every object in the local area past a threshold distance can be viewed by at least two cameras. This configuration allows the depth camera sub-assembly 450 to view objects in the local area from multiple angles and to capture image information with significant overlap, enabling the controller 465 to determine more accurate depth information and to reconstruct high quality 3D-360 degree images and/or video.

By arranging a plurality of projectors and cameras in a substantially spherical arrangement, depth information may be calculated for a 3D 360-degree local area. The calculated depth information may be used to generate a three-dimensional model of the local area, allowing for a more realistic and immersive virtual or augmented reality environment.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A camera system comprising:
   a plurality of depth camera sub-assemblies arranged in a substantially spherical arrangement around a center point, the plurality of depth camera sub-assemblies together having a 360 degree view of a local area surrounding the camera system, and each depth camera sub-assembly comprising:
      a projector facing away from the center point and configured to project a structured light pattern over a field of view of the local area, the projected structured light pattern being part of a tiled structured light pattern that is projected into 360 degrees of the local area formed by respective structured light patterns projected by projectors of the plurality of depth camera sub-assemblies, wherein the respective structured light patterns are time-multiplexed such that each projector of at least a portion of the plurality of depth camera sub-assemblies projects its respective structured light pattern over a different time period;
      a plurality of cameras, each positioned facing away from the center point, and configured capture one or more images of at least a portion of the structured light pattern projected by the projector, wherein the projector of the depth camera sub-assembly is surrounded by the plurality of cameras; and
   a controller configured to:
      receive the one or more images from the at least one camera of each of the plurality of depth camera sub-assemblies;
      construct a 360 degree depth map of the local area, based upon the structured light patterns projected by the projectors of the plurality of depth camera sub-assemblies in the received images.

2. The camera system of claim 1, wherein the projector of each of the plurality of depth camera sub-assemblies is positioned such that an optical axis of the projector intersects the center point.

3. The camera system of claim 1, wherein the at least one camera of each of the plurality of depth camera sub-assemblies is positioned such that an optical axis of the at least one camera intersects the center point.

4. The camera system of claim 1, wherein a depth camera sub-assembly, of the plurality of depth camera sub-assemblies, comprises a plurality of cameras having overlapping fields of view.

5. The camera system of claim 1, wherein the projectors of the plurality of depth camera sub-assemblies are configured to project respective structured light patterns associated with different frequency ranges.

6. The camera system of claim 1, wherein a portion of the local area is within a field of view of at least two cameras of the at least one camera of each of the plurality of depth camera sub-assemblies, and wherein the controller is configured to construct a portion of the 360 degree depth map corresponding to the portion of the local area based upon stereo images of the local area captured by the at least two cameras.

7. A camera system comprising:
   a plurality of depth camera sub-assemblies arranged in a substantially spherical arrangement around a center point, the plurality of depth sub-camera assemblies together having a 360 degree view of a local area surrounding the camera system, each depth camera sub-assembly comprising:
      a projector facing away from the center point and configured to project a structured light pattern over a field of view of the local area, the projected structured light pattern being part of a tiled structured light pattern that is projected into 360 degrees of the local area formed by respective structured light patterns projected by projectors of the plurality of depth camera sub-assemblies, wherein the respective structured light patterns are time-multiplexed such that each projector of at least a portion of the plurality of depth camera sub-assemblies projects its respective structured light pattern over a different time period;
      a plurality of cameras, each positioned facing away from the center point, and configured to capture one or more images of the local area in accordance with the imaging instructions, wherein the projector of the depth camera sub-assembly is surrounded by the plurality of cameras; and
   at least one controller configured to:
      provide imaging instructions to the plurality of depth camera sub-assemblies;
      receive the one or more images from the at least one camera of each of the plurality of depth camera sub-assemblies;

construct a 360 degree depth map of the local area, based in part on the structured light patterns projected by the projectors of the plurality of depth camera sub-assemblies in one or more of the received images.

8. The camera system of claim 7, wherein the projector of each of the plurality of depth camera sub-assemblies is positioned such that an optical axis of the projector intersects the center point, and wherein the at least one camera of each of the plurality of depth camera sub-assemblies is positioned such that an optical axis of the at least one camera intersects the center point.

9. The camera system of claim 7, wherein a depth camera sub-assembly, of the plurality of depth camera sub-assemblies, comprises a plurality of cameras having overlapping fields of view.

10. The camera system of claim 7, wherein the imaging instructions are configured to cause the projectors of the plurality of depth camera sub-assemblies to project respective structured light patterns associated with different frequency ranges.

11. The camera system of claim 7, wherein a portion of the local area is within a field of view of at least two cameras of the at least one camera of each of the plurality of depth camera sub-assemblies, and wherein the controller is configured to construct a portion of the 360 degree depth map corresponding to the portion of the local area based upon stereo images of the local area captured by the at least two cameras.

12. A camera system comprising:
a plurality of depth camera sub-assemblies arranged in a substantially spherical arrangement around a center point, the plurality of depth camera sub-assemblies together having a 360 degree view of a local area surrounding the camera system, each depth camera sub-assembly comprising:
a projector facing away from the center point and configured to project a structured light pattern over a field of view of the local area, the projected structured light pattern being part of a tiled structured light pattern that is projected into 360 degrees of the local area formed by respective structured light patterns projected by projectors of the plurality of depth camera sub-assemblies, wherein the respective structured light patterns are time-multiplexed such that each projector of at least a portion of the plurality of depth camera sub-assemblies projects its respective structured light pattern over a different time period;
a plurality of cameras, each positioned facing away from the center point, and configured to capture one or more images of the local area in accordance with the imaging instructions, wherein the projector of the depth camera sub-assembly is surrounded by the plurality of cameras; and
at least one controller configured to:
provide imaging instructions to the plurality of depth camera sub-assemblies;
receive the one or more images from the at least one camera of each of the plurality of depth camera sub-assemblies;
construct a 360 degree depth map of the local area, based upon the structured light patterns projected by the projectors of the plurality of structured light sub-assemblies in the received images; and
provide some of the images and the 360 degree depth map to a processing server, wherein the processing server generates 360 degree-3 dimensional (3D) content using the provided images and the 360 degree depth map.

13. The camera system of claim 12, wherein the projector of each of the plurality of depth camera sub-assemblies is positioned such that an optical axis of the projector intersects the center point, and wherein the at least one camera of each of the plurality of depth camera sub-assemblies is positioned such that an optical axis of the at least one camera intersects the center point.

14. The camera system of claim 12, wherein a depth camera sub-assembly, of the plurality of depth camera sub-assemblies, comprises a plurality of cameras having overlapping fields of view.

15. The camera system of claim 12, wherein the imaging instructions are configured to cause the projectors of the plurality of depth camera sub-assemblies to project respective structured light patterns associated with different frequency ranges.

16. The camera system of claim 12, wherein a portion of the local area is within a field of view of at least two cameras of the at least one camera of each of the plurality of depth camera sub-assemblies, and wherein the controller is configured to construct a portion of the 360 degree depth map corresponding to the portion of the local are based upon stereo images of the local area captured by the at least two cameras.

* * * * *

UNITED STATES PATENT AND TRADEMARK OFFICE
CERTIFICATE OF CORRECTION

PATENT NO.        : 10,440,349 B2
APPLICATION NO.   : 15/717332
DATED             : October 8, 2019
INVENTOR(S)       : Joseph Duggan, Cina Hazegh and Fei Liu Page 1 of 1

It is certified that error appears in the above-identified patent and that said Letters Patent is hereby corrected as shown below:

On the Title Page

Title (54), delete "3-D 360 DEGREES DEPTH PROJECTOR" and insert -- 3-D 360 DEGREE DEPTH PROJECTOR --

Signed and Sealed this
Sixteenth Day of June, 2020

Andrei Iancu
*Director of the United States Patent and Trademark Office*